(12) United States Patent
Shirafuji et al.

(10) Patent No.: US 8,389,611 B2
(45) Date of Patent: Mar. 5, 2013

(54) PRESSURE SENSITIVE ADHESIVE COMPOSITION FOR OPTICAL MEMBERS, PRESSURE SENSITIVE ADHESIVE LAYER FOR OPTICAL MEMBERS, PRESSURE SENSITIVE ADHESIVE OPTICAL MEMBER AND IMAGE DISPLAY

(75) Inventors: Fumiaki Shirafuji, Ohtsu (JP); Masayuki Satake, Ibaraki (JP); Kohei Yano, Ibaraki (JP); Yutaka Moroishi, Ibaraki (JP); Fumiko Nakano, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 261 days.

(21) Appl. No.: 11/814,775

(22) PCT Filed: Jan. 10, 2006

(86) PCT No.: PCT/JP2006/300131
§ 371 (c)(1),
(2), (4) Date: Jul. 25, 2007

(87) PCT Pub. No.: WO2006/080185
PCT Pub. Date: Aug. 3, 2006

(65) Prior Publication Data
US 2009/0023869 A1    Jan. 22, 2009

(30) Foreign Application Priority Data
Jan. 25, 2005    (JP) .................................. 2005-016933

(51) Int. Cl.
*C08K 5/101*    (2006.01)
*C08K 5/01*    (2006.01)
*C08K 5/03*    (2006.01)

(52) U.S. Cl. ...................... 524/315; 156/306.3; 156/358; 252/364; 349/113; 349/115; 524/81; 524/284; 524/300; 524/476; 524/484; 524/490; 524/556; 524/560; 525/342; 525/451

(58) Field of Classification Search .................. 349/113, 349/115; 524/81, 556, 560; 525/342, 451
See application file for complete search history.

(56) References Cited

U.S. PATENT DOCUMENTS

| | | | | |
|---|---|---|---|---|
| 3,607,816 A * | 9/1971 | Holzer et al. | ................. | 524/272 |
| 3,632,412 A * | 1/1972 | Blance et al. | ................. | 442/151 |
| 4,329,384 A | 5/1982 | Vesley et al. | | |
| 4,554,324 A * | 11/1985 | Husman et al. | ................. | 525/301 |
| 5,068,291 A * | 11/1991 | Gallaway et al. | ............... | 525/366 |
| 5,214,094 A * | 5/1993 | Levine et al. | ................. | 524/560 |
| 5,599,872 A * | 2/1997 | Sulewski | ...................... | 524/522 |
| 6,451,156 B2 | 9/2002 | Kishioka et al. | | |
| 6,599,967 B2 * | 7/2003 | Kishioka et al. | ............. | 524/261 |
| 2004/0168182 A1 * | 8/2004 | Kakuta et al. | ................. | 720/718 |
| 2005/0014879 A1 | 1/2005 | Moroishi et al. | | |
| 2005/0073633 A1 * | 4/2005 | Satake et al. | ................. | 349/113 |

FOREIGN PATENT DOCUMENTS

| | | |
|---|---|---|
| JP | 53-97851 | 8/1978 |
| JP | 53-97851 A | 8/1978 |
| JP | 59-111115 A | 6/1984 |
| JP | 8-199131 A | 8/1996 |
| JP | 08-253749 A | 10/1996 |
| JP | 2549388 B2 | 10/1996 |
| JP | 2001-049217 A | 2/2001 |
| JP | 2002-107507 A | 4/2002 |
| JP | 2002121521 A | 4/2002 |
| JP | 2002-309208 A | 10/2002 |
| JP | 2003-49141 A | 2/2003 |
| JP | 2003-131034 A | 5/2003 |
| JP | 2003-181989 A | 7/2003 |
| JP | 2004-145139 A | 5/2004 |
| JP | 2004-184860 A | 7/2004 |
| JP | 2004-263165 A | 9/2004 |
| JP | 2004-323543 A | 11/2004 |
| JP | 2005-42061 A | 2/2005 |
| JP | 2005-43795 A | 2/2005 |
| JP | 2005-48003 A | 2/2005 |
| JP | 2005-325340 A | 11/2005 |
| JP | 2006-36810 A | 2/2006 |
| JP | 2006-169428 A | 6/2006 |
| WO | 03/065087 * | 8/2003 |

OTHER PUBLICATIONS

Heptane MSDS.*
Ethyl Acetate MSDS.*
Toluene MSDS.*
Chung, Journal of Applied Polymer Science, vol. 42, Issue 5, p. 1319-1331.*
International Search Report of PCT/JP2006/300131, date of mailing Mar. 7, 2006.
International Preliminary Report on Patentability of Corresponding International Application No. PCT/JP2006/300131 mailed Aug. 9, 2007.

(Continued)

*Primary Examiner* — Robert C Boyle
(74) *Attorney, Agent, or Firm* — Westerman, Hattori, Daniels & Adrian, LLP

(57) ABSTRACT

An object of the present invention is to provide a pressure sensitive adhesive composition for an optical member, which is excellent in coating property because of low viscosity, can reduce an amount of an organic solvent used, and can form a pressure sensitive adhesive layer excellent in durability and having high surface uniformity. The present invention relates to a pressure sensitive adhesive composition for an optical member, which comprises a (meth)acrylic polymer, a C6 to C9 hydrocarbon-based solvent (A), and a high-boiling highly solubilizing solvent (B) having a boiling point higher than that of the above hydrocarbon-based solvent and having a higher ability to solubilize the (meth)acrylic polymer than that of the above hydrocarbon-based solvent, wherein a content of the hydrocarbon-based solvent (A) is 20 to 60 wt % based on the total amount of the solvents, and a ratio of the content (wt %) of the hydrocarbon-based solvent (A) to the content (wt %) of the high-boiling highly solubilizing solvent (B) (high-boiling highly solubilizing solvent (B)/hydrocarbon-based solvent (A)) is 0.05 to 4.

8 Claims, No Drawings

OTHER PUBLICATIONS

Chinese Office Action dated Nov. 7, 2008, issued in corresponding Chinese Patent Application No. 200600025411.
Korean Office Action dated Mar. 13, 2009, issued in corresponding Korean Patent Application No. 10-2007-7019034.
Japanese Office Action dated Jan. 28, 2011, issued in corresponding Japanese Patent Application No. 2005-016933.
English Translation of Korean Office Action dated Mar. 13, 2009, issued in corresponding Korean Patent Application No. 10-2007-7019034.
English Translation of Chinese Office Action issued in corresponding Chinese Patent Application No. 200680002541.1.

* cited by examiner

PRESSURE SENSITIVE ADHESIVE COMPOSITION FOR OPTICAL MEMBERS, PRESSURE SENSITIVE ADHESIVE LAYER FOR OPTICAL MEMBERS, PRESSURE SENSITIVE ADHESIVE OPTICAL MEMBER AND IMAGE DISPLAY

TECHNICAL FIELD

The present invention relates to a pressure sensitive adhesive composition for optical members. The present invention also relates to a pressure sensitive adhesive layer for optical members, which is formed from the pressure sensitive adhesive composition for optical members. Further, the present invention relates to a pressure sensitive adhesive optical member having the pressure sensitive adhesive layer and also to an image display such as a liquid crystal display, an organic EL display and PDP, using the pressure sensitive adhesive optical member. The optical member includes a polarizing plate, a retardation plate, an optical compensating film, a brightness enhancement film, and a laminate thereof.

BACKGROUND ART

In a pressure sensitive adhesive layer used for an optical member, its thickness and surface uniformity are required at high levels. Accordingly, its polymer composition is applied at lower viscosity by reducing a concentration of a polymer. In the present situation, however, an amount of an organic solvent used is desired to reduce to the minimum level for environmental consideration.

For a method of using no organic solvent, there are emulsion pressure sensitive adhesives or UV-polymerizable pressure sensitive adhesives, but use of these adhesives for optical members does not reach a practical level due to a problem in water resistance and uniformity in thickness.

As a method wherein a viscosity of a polymer solution is not increased even if a concentration of a polymer is increased, there is a method of decreasing a molecular weight of the polymer. However, an optical member used in a liquid crystal display etc., for example, a polarizing plate or a retardation film, is attached via an adhesive to a liquid crystal cell, but the optical member expands or shrinks under heating conditions or humid conditions and thus raising or peeling easily occurs after attachment. When the molecular weight of a polymer is low, raising or peeling easily occurs under heating conditions or humid conditions, thus making it difficult to decrease the molecular weight of the polymer.

For the purpose of maintaining excellent adhesive properties even under high-temperature humid conditions to prevent foaming or peeling upon dimensional change, a pressure sensitive adhesive composition for a polarizing plate, which comprises a plurality of specific (meth)acrylic polymers and a crosslinking agent, is disclosed (Patent Document 1).

For the purpose of decreasing a change with time in cohesion and adhesion at a high temperature or at a high temperature under high humidity, a pressure sensitive adhesive composition, which comprises a curing agent and a specific silane compound incorporated into an acrylic resin, is disclosed (Patent Document 2).

However, these conventional pressure sensitive adhesive compositions cannot satisfy both reduction in an amount of an organic solvent used and the high surface uniformity of a pressure sensitive adhesive layer formed.

Patent Document 1: JP-A 2003-49141
Patent Document 2: JP-A 8-199131

DISCLOSURE OF THE INVENTION

Problems to be Solved by the Invention

An object of the present invention is to provide a pressure sensitive adhesive composition for an optical member, which is excellent in coating property because of low viscosity, can reduce an amount of an organic solvent used, and can form a pressure sensitive adhesive layer excellent in durability and having high surface uniformity. A further object of the invention is to provide a pressure sensitive adhesive layer for an optical member, which is formed from the pressure sensitive adhesive composition for an optical member. A still further object of the invention is to provide a pressure sensitive adhesive optical member having the pressure sensitive adhesive layer, as well as an image display using the pressure sensitive adhesive optical member.

For achieving these objects, the present inventors made extensive study, and as a result, they found that the objects can be achieved by the following pressure sensitive adhesive composition for an optical member, and the present invention was thereby completed.

That is, the present invention relates to a pressure sensitive adhesive composition for an optical member, which comprises a (meth)acrylic polymer, a C6 to C19 hydrocarbon-based solvent (A), and a high-boiling highly solubilizing solvent (B) having a boiling point higher than that of the above hydrocarbon-based solvent and having a higher ability to solubilize the (meth)aciylic polymer than that of the above hydrocarbon-based solvent, wherein a content of the hydrocarbon-based solvent (A) is 20 to 60 wt % based on the total amount of the solvents, and a ratio of the content (wt %) of the hydrocarbon-based solvent (A) to the content (wt %) of the high-boiling highly solubilizing solvent (B) (high-boiling highly solubilizing solvent (B)/hydrocarbon-based solvent (A)) is 0.05 to 4.

In the pressure sensitive adhesive composition for an optical member of the present invention, the two kinds of solvents described above are simultaneously used as a solvent for dissolving the (meth)acrylic polymer, so that after an optical member having a pressure sensitive adhesive layer comprising the pressure sensitive adhesive composition for an optical member is attached to a liquid crystal cell or the like, the pressure sensitive adhesive layer can be prevented from raising or peeling even upon exposure to heating conditions or humid conditions. Further, the pressure sensitive adhesive composition for an optical member is excellent in applicability due to its low viscosity and can reduce the amount of an organic solvent used, and the surface uniformity of a pressure sensitive adhesive layer formed can be kept high.

The reason that these effects are brought about by simultaneously using the above 2 kinds of solvents is not evident, but is estimated as follows. By using the hydrocarbon-based solvent (A), the polymer domain of the (meth)acrylic polymer can be shrunk. Accordingly, a viscosity of the pressure sensitive adhesive composition can be reduced, but when only the solvent (A) is used, the polymer is precipitated upon coating and drying, thus significantly deteriorating surface uniformity of the pressure sensitive adhesive layer, or precipitation of the polymer makes entanglement among molecular chains insufficient so that the pressure sensitive adhesive layer is easily raised and peeled off under heating conditions or humid conditions. However, when the high-boiling highly solubilizing solvent (B) is used in combination with the solvent (A), the high-boiling highly solubilizing solvent (B) vaporizes later than the hydrocarbon-based solvent (A) does, thus effectively preventing the polymer in the pressure sensitive adhesive composition from being precipitated in the pressure-adhesive layer during coating and drying, so the surface uniformity of the pressure sensitive adhesive layer formed can be kept high. The high-boiling highly solubilizing solvent (B) has high solubility for a polymer, and thus the polymer domain expands to increase entanglement among molecular chains so that the crosslinkage among the molecular chains proceeds uniformly. Accordingly, it is considered that the pressure sensitive adhesive layer, even upon exposure to heating conditions or humid conditions, can be prevented from being raised or peeled off.

In the present invention, it is necessary that a content of the hydrocarbon-based solvent (A) should be 20 to 60 wt % based on the total amount of the organic solvents. When the content is less than 20 wt %, an effect of reducing a viscosity of the pressure sensitive adhesive composition is low, so it is difficult to reduce the amount of the organic solvent used. On the other hand, when the content is greater than 60 wt %, the (meth)acrylic polymer is precipitated during coating and drying, to significantly deteriorate the surface uniformity of the pressure sensitive adhesive layer, or the precipitation of the polymer makes entanglement among molecular chains insufficient so that the pressure sensitive adhesive layer is easily raised and peeled off under heating conditions or humid conditions.

In the present invention, a ratio of a content (wt %) of the hydrocarbon-based solvent (A) to a content (wt %) of the high-boiling highly solubilizing solvent (B) (high-boiling highly solubilizing solvent (B)/hydrocarbon-based solvent (A)) should be 0.05 to 4. When the ratio is less than 0.05, the polymer is precipitated in the pressure sensitive adhesive composition during coating and drying, thus significantly deteriorating the surface uniformity of the pressure sensitive adhesive layer, or the precipitation of the polymer makes entanglement among molecular chains insufficient so that the pressure sensitive adhesive layer is easily raised and peeled off under heating conditions or humid conditions. On the other hand, when the ratio is greater than 4, it becomes difficult that the solvent is sufficiently dried and removed to deteriorate adhesive properties such as durability.

In the present invention, it is preferable that the (meth) acrylic polymer comprises 60 wt % or more of alkyl acrylate having a C2 to C4 alkyl group as a monomer, has a weight-average molecular weight of 1,500,000 or more, and contains 20 wt % or less of polymer component having a molecular weight of 100,000 or less. Preferably, the (meth)acrylic polymer further comprises 0.2 to 7 wt % unsaturated carboxylic acid as a monomer.

In the pressure sensitive adhesive composition for an optical member according to the present invention, it is preferable that a silane coupling agent is contained in an amount of 0.01 to 1 part by weight based on 100 parts by weight of the (meth)acrylic polymer. Preferably, a crosslinking agent is contained in an amount of 0.1 to 5 parts by weight based on 100 parts by weight of the (meth)acrylic polymer. A pressure sensitive adhesive layer having a crosslinked structure formed by the pressure sensitive adhesive composition containing a silane coupling agent and a crosslinking agent, when used to attach an optical member to a liquid crystal cell, is excellent in durability and is prevented from peeling, raising or foaming in an adhering state even after subjected to various steps for a long time or after stored under high-temperature humid conditions.

The present invention relates to a pressure sensitive adhesive layer for an optical member, which is formed from the pressure sensitive adhesive composition for an optical member.

Further, the present invention relates to a pressure sensitive adhesive optical member having the pressure sensitive adhesive layer for an optical member on one or both sides of an optical member.

Furthermore, the present invention relates to an image display using at least one of the above-described pressure sensitive adhesive optical members.

BEST MODE FOR CARRYING OUT THE INVENTION

The pressure sensitive adhesive composition for an optical member according to the present invention consists primarily of a (meth)acrylic polymer, a C6 to C9 hydrocarbon-based solvent (A), and a high-boiling highly solubilizing solvent (B) having a boiling point higher than that of the above hydrocarbon-based solvent and having a higher ability to solubilize the (meth)acrylic polymer than that of the above hydrocarbon-based solvent. In the present invention, the (meth)acrylic polymer refers to acrylic polymer and/or methacrylic polymer. Throughout the specification, the term "(meth)" is used in the same meaning.

The (meth)acrylic polymer used in the present invention is not particularly limited, but from the viewpoint of low glass transition point and elasticity, the (meth)acrylic polymer is preferably a homopolymer or copolymer of alkyl (meth)acrylates having a C2 to C4 alkyl group, or a mixture thereof. The number of carbon atoms in the alkyl group is more preferably 3 to 4. The alkyl group may be a linear or branched chain.

From the viewpoint of adhesive properties, the (meth) acrylic polymer preferably contains an C2 to C4 alkyl group-containing alkyl (meth)acrylate as a monomer unit in an amount of preferably 60 wt % or more, more preferably 70 wt % or more.

The (meth)acrylic polymer may be a polymer copolymerized with an unsaturated carboxylic acid to regulate adhesive properties.

The unsaturated carboxylic acid includes, for example, acrylic acid, methacrylic acid, itaconic acid and maleic acid. Anhydrides thereof can be also used. Among these compounds, acrylic acid and methacrylic acid are preferably used.

The (meth)acrylic polymer preferably contains an unsaturated carboxylic acid as a monomer unit in an amount of preferably 0.2 to 7 wt %, more preferably 0.5 to 5 wt %. The content of the unsaturated carboxylic acid out of these ranges is not preferable because when the content is less than 0.2 wt %, durability is decreased, while when the content is greater than 7 wt %, the pressure sensitive adhesive layer shows too high adhesion to a liquid crystal cell and is made too rigid.

The (meth)acrylic polymer may contain other monomers than those described above. Other monomers include, for example, alkyl (meth)acrylates having a C5 or more alkyl group, such as pentyl (meth)acrylate, hexyl (meth)acrylate, octyl (meth)acrylate and lauryl (meth)acrylate; monomers having a hydroxyl group, such as 2-hydroxyethyl (meth)acrylate, 2-hydroxypropyl (meth)acrylate, hydroxybutyl (meth) acrylate, hydroxyhexyl (meth)acrylate, and N-methylol (meth)acrylamide; monomers having an epoxy group, such as glycidyl (meth)acrylate; and monomers having a nitrogen element, such as (meth)acrylamide, N,N-dimethyl (meth) acrylamide, N,N-diethyl (meth)acrylamide, (meth)acryloyl morpholine, (meth)acetonitrile, vinyl pyrrolidone, N-cyclohexyl maleimide, itaconamide, and N,N-dimethylaminoethyl (meth)acramide. Further, vinyl acetate, styrene etc. can be also used. These monomers can be used alone or in combination with 2 or more thereof.

A weight-average molecular weight (determined by GPC) of the (meth)acrylic polymer is preferably 1,500,000 or more, more preferably 2,000,000 or more. When the weight-average molecular weight is less than 1,500,000, a pressure sensitive adhesive layer tends to be poor in durability. A content of a polymer component having a molecular weight of 100,000 or less in the (meth)acrylic polymer is preferably 20 wt % or less, more preferably 10 wt % or less. In the present invention, entanglement of polymer chains is reduced by using the C6 to C9 hydrocarbon-based solvent (A), and thus the crosslinkage among polymer molecular chains is significantly deteriorated when the amount of low-molecular-weight polymer components is large. Accordingly, the amount of low-molecular-weight polymer components is preferably lower.

In production of the (meth)acrylic polymer, a known radical polymerization method such as solution polymerization, bulk polymerization or emulsion polymerization can be suitably selected, wherein the radical polymerization method using an organic solvent is preferable. The polymerization method using water, such as in emulsion polymerization, is economically disadvantageous because the product should be once dried to remove water and then mixed with the solvent in the invention. As the radical polymerization initiator, a wide variety of known initiators such as azo- or peroxide-based initiators can be used. For example, in solution polymerization, a polymerization initiator such as azobisbutyronitrile is used in an amount of about 0.01 to 0.2 part by weight based on 100 parts by weight of the whole monomers. As the polymerization solvent, a good solvent such as ethyl acetate and toluene is used. The reaction is carried out usually at about 50 to 70° C. for 8 to 15 hours in a stream of an inert gas such as nitrogen.

In the present invention, the C6 to C9 hydrocarbon-based solvent (A) and the high-boiling highly solubilizing solvent (B) having a boiling point higher than that of the above hydrocarbon-based solvent and having a higher ability to solubilize the (meth)acrylic polymer than that of the above hydrocarbon-based solvent should be simultaneously used.

The number of carbon atoms in the hydrocarbon-based solvent (A) is preferably 6 to 8. A hydrocarbon-based solvent having 5 or less carbon atoms lacks coating stability because of its too low boiling point. On the other hand, a hydrocarbon-based solvent having 10 or more carbon atoms has a too high boiling point and thus the solvent remains in the pressure sensitive adhesive layer even after drying, so adhesive properties such as durability tend to be decreased.

The C6 to C9 hydrocarbon-based solvent (A) may be a linear, branched or cyclic hydrocarbon, and specific examples thereof include 3-methylpentane, n-hexane, 2,4-dimethylpentane, 2,2,3-trimethylbutane, 3,3-dimethylpentane, 2-methylhexane, 2,3-dimethylpentane, 3-methylhexane, n-heptane, cyclohexane, methylcyclohexane, 2,2-dimethylhexane, 2,3-dimethylhexane, 2,5-dimethylhexane, 2,4-dimethylhexane, 3,3-dimethylhexane, 3,4-dimethylhexane, 2,3,4-trimethylpentane, 2,3,3-trimethylpentane, 2-methyl-3-ethylpentane, 2-methylheptane, 3-methylheptane, 4-methylheptane, 2,2,5-trimethylhexane, n-octane, cyclooctane, nonane, and cyclononane. These solvents may be used alone or as a mixture of two or more thereof. A solvent containing these compounds may also be used, and specifically Cactus Solvent (available from Japan Energy Corporation) can be mentioned.

The content of the hydrocarbon-based solvent (A) in the pressure sensitive adhesive composition for an optical member is 20 to 60 wt %, preferably 35 to 55 wt %, more preferably 40 to 50 wt %, based on the whole the organic solvents used.

The high-boiling highly solubilizing solvent (B) is not particularly limited insofar far as it is an organic solvent having a higher boiling point than that of the hydrocarbon-based solvent (A) and having a higher ability to dissolve the (meth)acrylic polymer than that of the hydrocarbon-based solvent (A), but preferably, the boiling point of the high-boiling highly solubilizing solvent (B) is higher by at least 5° C. than that of the hydrocarbon-based solvent (A). The high-boiling highly solubilizing solvent (B) is selected such that the difference $\Delta\theta$ ($\Delta\theta = \theta 1 - \theta 2$) between the solubility parameter $\theta 1$ [$(cal/cm^3)^{1/2}$]) of the high-boiling highly solubilizing solvent (B) and the solubility parameter $\theta 2$ [$(cal/cm^3)^{1/2}$]) of the (meth)acrylic polymer becomes preferably 0.8 or less, more preferably 0.5 or less, particularly preferably 0.3 or less. The solubility parameter is described in, for example, Polymer Handbook, the 3rd edition, published by Wiley Interscience.

The high-boiling highly solubilizing solvent (B) used in the present invention includes, for example, aromatic hydrocarbon solvents such as toluene and xylene, aliphatic carboxylate solvents such as ethyl acetate and butyl acetate, and ketone solvents such as methyl ethyl ketone and ethyl butyl ketone. The high-boiling highly solubilizing solvent (B) should be suitably selected to satisfy the above conditions in relationship with the hydrocarbon-based solvent (A).

In the present invention, the ratio of the content (wt %) of the hydrocarbon-based solvent (A) to the content (wt %) of the high-boiling highly solubilizing solvent (B) (high-boiling highly solubilizing solvent (B)/hydrocarbon-based solvent (A)) is 0.05 to 4, preferably 0.05 to 1.86, more preferably 0.2 to 0.75.

The pressure sensitive adhesive composition for an optical member according to the present invention preferably contains a silane coupling agent and a crosslinking agent.

As the silane coupling agent, a conventionally known one can be used without particular limitation. Examples include an epoxy group-containing silane coupling agents such as 3-glycidoxypropyltrimethoxysilane, 3-glycidoxypropylmethyldiethoxysilane and 2-(3,4-epoxycyclohexyl)ethyltrimethoxysilane; an amino group-containing silane coupling agents such as 3-aminopropyltrimethoxysilane, N-2-(aminoethyl)-3-aminopropylmethyldimethoxysilane and 3-triethoxysilyl-N-(1,3-dimethylbutylidene) propylamine; a (meth)acryl group-containing silane coupling agents such as 3-acryloxypropyltrimethoxysilane and 3-methacryloxypropyltriethoxysilane; and an isocyanate group-containing silane coupling agents such as 3-isocyanatopropyltriethoxysilane.

An amount of the silane coupling agent added is preferably 0.01 to 1 part by weight, more preferably 0.02 to 0.6 part by weight, based on 100 parts by weight of the (meth)acrylic polymer. An amount of the silane coupling agent added out of these ranges is not preferable because when the amount is greater than 1 part by weight, the adhesion to a liquid crystal cell is increased to deteriorate re-peeling property, while when the amount is less than 0.01 part by weight, durability is decreased.

The crosslinking agent is a multifunctional compound capable of reacting with the (meth)acrylic polymer to form a crosslinked structure. The crosslinking agent includes, for example, tolylene diisocyanate, diphenyl methane diisocyanate, polyisocyanate compounds such as various polyols having diisocyanate compounds added thereto, epoxy compounds, aziridine compounds, melamine compounds, metal salts, and metal chelate compounds. Among these compounds, the polyisocyanate compounds are preferably used. Particularly, it is preferable that when the (meth)acrylic polymer is produced, hydroxy-containing monomers such as 2-hydroxyethyl acrylate are copolymerized, and when hydroxyl groups are introduced into the (meth)acrylic polymer, a crosslinked structure is formed by using a polyisocyanate compound as a crosslinked agent.

An amount of the crosslinking agent added is preferably 0.01 to 5 parts by weight, more preferably 0.02 to 2 parts by weight, based on 100 parts by weight of the (meth)acrylic polymer. When the amount of the crosslinking agent added is less than 0.01 wt %, durability tends to be inferior since the crosslinked structure is not sufficiently formed, while when the amount of the crosslinking agent added is greater than 5 wt %, stress relaxation tends to be inferior.

The pressure sensitive adhesive composition for optical members according to the present invention can blended if necessary with an UV absorber, aging inhibitor, softener, dye, pigment, filler etc.

The pressure sensitive adhesive optical member of the present invention is obtained by forming a pressure sensitive adhesive layer of the pressure sensitive adhesive composition for optical members, on one side or both sides of an optical member.

The method of forming the pressure sensitive adhesive layer on an optical member is not particularly limited, but examples thereof are 1) a method wherein the pressure sensitive adhesive composition is applied onto a peel-treated support (release sheet) and dried (subjected to crosslinking reaction, if necessary) to form a pressure sensitive adhesive layer which is then transferred onto an optical member, and 2) the pressure sensitive adhesive composition is applied directly onto an optical member and dried (subjected to crosslinking reaction, if necessary) to form a pressure sensitive adhesive layer.

For application of the pressure sensitive adhesive composition, any arbitrary coating methods using a roll coater such as a reverse coater or a gravure coater, a curtain coater, a lip coater or a die coater can be used. The thickness of the pressure sensitive adhesive layer after drying is usually 2 to 500 μm, preferably 5 to 100 μm.

The material of the support (release sheet) includes paper, synthetic resin films such as polyethylene, polypropylene and polyethylene terephthalate, and suitable thin bodies such as rubber sheet, paper, cloth, nonwoven fabric, net, foamed sheet, and metallic foil, and a laminate thereof. The surface of the support may be subjected, if necessary, to peeling treatment such as silicone treatment, long-chain alkyl treatment and fluorine treatment for improving releasability from the pressure sensitive adhesive layer.

The pressure sensitive adhesive layer, when exposed to the surface of the pressure sensitive adhesive optical member, is preferably protected with a peel-treated sheet prior to practical use.

As optical members, members used for formation of image displays, such as liquid crystal displays, may be used, and kinds are not especially limited. For example, polarizing plates may be mentioned as optical members As polarizing plates, in general a polarizing plate having transparent protective film one side or both sides of a polarizer is used.

A polarizer is not limited especially but various kinds of polarizer may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type orientation films, such as dehydrated polyvinyl alcohol and dehydrochlorinated polyvinyl chloride, etc. may be mentioned. In these, a polyvinyl alcohol type film on which dichromatic materials (iodine, dyes) is absorbed and oriented after stretched is suitably used. Although thickness of polarizer is not especially limited, the thickness of about 5 to 80 μm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide, which may include zinc sulfate, zinc chloride. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

As the protective film prepared on one side or both sides of the polarizer, materials is excellent in transparency, mechanical strength, heat stability, water shielding property, isotropy, etc. may be preferably used. As materials of the above-mentioned protective layer, for example, polyester type polymers, such as polyethylene terephthalate and polyethylenenaphthalate; cellulose type polymers, such as diacetyl cellulose and triacetyl cellulose; acrylics type polymer, such as poly methylmethacrylate; styrene type polymers, such as polystyrene and acrylonitrile-styrene copolymer (AS resin); polycarbonate type polymer may be mentioned. Besides, as examples of the polymer forming a protective film, polyolefin type polymers, such as polyethylene, polypropylene, polyolefin that has cyclo-type or norbornene structure, ethylene-propylene copolymer; vinyl chloride type polymer; amide type polymers, such as nylon and aromatic polyamide; imide type polymers; sulfone type polymers; polyether sulfone type polymers; polyether-ether ketone type polymers; poly phenylene sulfide type polymers; vinyl alcohol type polymer; vinylidene chloride type polymers; vinyl butyral type polymers; allylate type polymers; polyoxymethylene type polymers; epoxy type polymers; or blend polymers of the above-mentioned polymers may be mentioned. Films made of heat curing type or ultraviolet ray curing type resins, such as acryl based, urethane based, acryl urethane based, epoxy based, and silicone based, etc. may be mentioned.

Moreover, as is described in Japanese Patent Laid-Open Publication No. 2001-343529 (WO 01/37007), polymer films, for example, resin compositions including (A) thermoplastic resins having substituted and/or non-substituted imido group is in side chain, and (B) thermoplastic resins having substituted and/or non-substituted phenyl and nitrile group in side chain may be mentioned. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used.

In general, a thickness of the protection film, which can be determined arbitrarily, is 1 through 500 μm, preferably 1 through 300 μm, and especially preferably 5 through 200 μm in viewpoint of strength, work handling and thin layer.

Moreover, it is preferable that the protective film may have as little coloring as possible. Accordingly, a protective film having a phase difference value in a film thickness direction represented by Rth=[(nx+ny)/2−nz]×d of −90 nm through +75 nm (where, nx and ny represent principal indices of refraction in a film plane, nz represents refractive index in a film thickness direction, and d represents a film thickness) may be preferably used. Thus, coloring (optical coloring) of polarizing plate resulting from a protective film may mostly be cancelled using a protective film having a phase difference value (Rth) of −90 nm through +75 nm in a thickness direction. The phase difference value (Rth) in a thickness direction is preferably −80 nm through +60 nm, and especially preferably −70 nm through +45 nm.

As a protective film, if polarization property and durability are taken into consideration, cellulose based polymer, such as triacetyl cellulose, is preferable, and especially triacetyl cellulose film is suitable. In addition, when the protective films are provided on both sides of the polarizer, the protective films comprising same polymer material may be used on both of a front side and a back side, and the protective films comprising different polymer materials etc. may be used. Adhesives are used for adhesion processing of the above described polarizer and the protective film. As adhesives, isocyanate derived adhesives, polyvinyl alcohol derived adhesives, gelatin derived adhesives, vinyl polymers derived latex type, aqueous polyurethane based adhesives, aqueous polyesters derived adhesives, etc. may be mentioned.

A hard coat layer may be prepared, or antireflection processing, processing aiming at sticking prevention, diffusion or anti glare may be performed onto the face on which the polarizing film of the above described protective film has not been adhered.

A hard coat processing is applied for the purpose of protecting the surface of the polarizing plate from damage, and this hard coat film may be formed by a method in which, for example, a curable coated film with excellent hardness, slide property etc. is added on the surface of the protective film using suitable ultraviolet curable type resins, such as acrylic type and silicone type resins. Antireflection processing is applied for the purpose of antireflection of outdoor daylight on the surface of a polarizing plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarizing plate to disturb visual recognition of transmitting light through the polarizing plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 μm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 50 weight part to the transparent resin 100 weight part that forms the fine concavo-convex structure on the surface, and preferably 5 to 25 weight part. An anti glare layer may serve as a diffusion layer (viewing angle expanding function etc.) for diffusing transmitting light through the polarizing plate and expanding a viewing angle etc.

In addition, the above-mentioned antireflection layer, sticking prevention layer, diffusion layer, anti glare layer, etc. may be built in the protective film itself, and also they may be prepared as an optical layer different from the protective layer.

An optical member of the present invention is especially no limitation about the optical layers, which may be used for formation of a liquid crystal display etc., such as a reflector, a transflective plate, a retardation plate (a half wavelength plate and a quarter wavelength plate included), and a viewing angle compensation film, may be used.

Especially preferable polarizing plates are; a reflection type polarizing plate or a transflective type polarizing plate in which a reflector or a transflective reflector is further laminated onto a polarizing plate of the present invention; an elliptically polarizing plate or a circular polarizing plate in which a retardation plate is further laminated onto the polarizing plate; a wide viewing angle polarizing plate in which a viewing angle compensation film is further laminated onto the polarizing plate; or a polarizing plate in which a brightness enhancement film is further laminated onto the polarizing plate.

A reflective layer is prepared on a polarizing plate to give a reflection type polarizing plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarizing plate may be formed using suitable methods, such as a method in which a reflective layer of metal etc. is, if required, attached to one side of a polarizing plate through a transparent protective layer etc.

As an example of a reflection type polarizing plate, a plate may be mentioned on which, if required, a reflective layer is formed using a method of attaching a foil and vapor deposition film of reflective metals, such as aluminum, to one side of a matte treated protective film. Moreover, a different type of plate with a fine concavo-convex structure on the surface obtained by mixing fine particle into the above-mentioned protective film, on which a reflective layer of concavo-convex structure is prepared, may be mentioned. The reflective layer that has the above-mentioned fine concavo-convex structure diffuses incident light by random reflection to prevent directivity and glaring appearance, and has an advantage of controlling unevenness of light and darkness etc. Moreover, the protective film containing the fine particle has an advantage that unevenness of light and darkness may be controlled more effectively, as a result that an incident light and its reflected light that is transmitted through the film are diffused. A reflective layer with fine concavo-convex structure on the surface effected by a surface fine concavo-convex structure of a protective film may be formed by a method of attaching a metal to the surface of a transparent protective layer directly using, for example, suitable methods of a vacuum evaporation method, such as a vacuum deposition method, an ion plating method, and a sputtering method, and a plating method etc.

Instead of a method in which a reflection plate is directly given to the protective film of the above-mentioned polarizing plate, a reflection plate may also be used as a reflective sheet constituted by preparing a reflective layer on the suitable film for the transparent film. In addition, since a reflective layer is usually made of metal, it is desirable that the reflective side is covered with a protective film or a polarizing plate etc. when used, from a viewpoint of preventing deterioration in reflectance by oxidation, of maintaining an initial reflectance for a long period of time and of avoiding preparation of a protective layer separately etc.

In addition, a transflective type polarizing plate may be obtained by preparing the above-mentioned reflective layer as a transflective type reflective layer, such as a half-mirror etc. that reflects and transmits light. A transflective type polarizing plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarizing plate. That is, the transflective type polarizing plate is useful to obtain of a liquid crystal display of the type that saves energy of light sources, such as a back light, in a well-lighted atmosphere, and can be used with a built-in light source if needed in a comparatively dark atmosphere etc.

The above-mentioned polarizing plate may be used as elliptically polarizing plate or circularly polarizing plate on which the retardation plate is laminated. A description of the above-mentioned elliptically polarizing plate or circularly polarizing plate will be made in the following paragraph. These polarizing plates change linearly polarized light into elliptically polarized light or circularly polarized light, elliptically polarized light or circularly polarized light into linearly polarized light or change the polarization direction of linearly polarization by a function of the retardation plate. As a retardation plate that changes circularly polarized light into linearly polarized light or linearly polarized light into circularly polarized light, what is called a quarter wavelength plate (also called λ/4 plate) is used. Usually, half-wavelength plate (also called λ/2 plate) is used, when changing the polarization direction of linearly polarized light.

Elliptically polarizing plate is effectively used to give a monochrome display without above-mentioned coloring by compensating (preventing) coloring (blue or yellow color) produced by birefringence of a liquid crystal layer of a super twisted nematic (STN) type liquid crystal display. Furthermore, a polarizing plate in which three-dimensional refractive index is controlled may also preferably compensate (prevent) coloring produced when a screen of a liquid crystal display is viewed from an oblique direction. Circularly polarizing plate is effectively used, for example, when adjusting a color tone of a picture of a reflection type liquid crystal display that provides a colored picture, and it also has function of antireflection.

As retardation plates, birefringent films obtained by uniaxially or biaxially stretched polymer materials, oriented films of liquid crystal polymers, oriented layers of liquid crystal polymers currently supported with films may be mentioned. A thickness of the retardation plate is also not especially limited, and it is about 20 to 150 μm in general.

As polymer material, for example, there may be mentioned: polyvinyl alcohols, polyvinyl butyrals, polymethyl vinyl ethers, polyhydroxy ethyl acrylates, hydroxyethyl celluloses, hydroxy propyl celluloses, methyl celluloses, polycarbonates, polyallylates, polysulfones, polyethylene terephthalates, polyethylene naphthalates, polyethersulfones, polyphenylene sulfides, polyphenylene oxides, polyallyl sulfones, polyamides, polyimides, polyolefins, polyvinyl chlorides, cellulose type polymers, and norbornene based resins, or binary or ternary copolymers, graft copolymers, and blend object thereof. These polymer materials are stretched to obtain an oriented object that is stretched film.

As liquid crystalline polymers, for example, various kinds of polymers of principal chain type and side chain type in which conjugated linear atomic groups (mesogens) conferring liquid crystalline orientation are introduced into a principal chain and a side chain of a polymer may be mentioned. As examples of principal chain type liquid crystalline polymers, polymers having a structure where mesogen groups are bonded by spacer parts conferring flexibility, for example, polyester based liquid crystalline polymers having nematic orientation property, discotic polymers, cholesteric polymers, etc. may be mentioned. As examples of side chain type liquid crystalline polymers, polymers having polysiloxanes, polyacrylates, polymethacrylates, or polymalonates as a principal chain skeleton, and having mesogen parts comprising para-substituted cyclic compound units conferring nematic orientation property as side chains via spacer parts comprising conjugated atomic groups may be mentioned. These liquid crystal polymer, for example, is aligned by developing a solution of a liquid crystal polymer on an orientation treated surface where rubbing treatment was performed to a surface of thin films, such as polyimide and polyvinyl alcohol, formed on a glass plate, or where silicon oxide is deposited by an oblique evaporation method, and then by heat-treating. Retardation plates that have suitable phase difference depending on the purpose of use, such as aiming at compensation of coloring or viewing angle using birefringence, for example, various wavelength plates and liquid crystal layers, may be used. In addition retardation plates in which two or more kinds of retardation plates are laminated together to control optical properties, such as phase difference may be used.

The above-mentioned elliptically polarizing plate and an above-mentioned reflected type elliptically polarizing plate are laminated plate combining suitably a polarizing plate or a reflection type polarizing plate with a retardation plate. This type of elliptically polarizing plate etc. may be manufactured by combining a polarizing plate (reflected type) and a retardation plate, and by laminating them one by one separately in the manufacture process of a liquid crystal display. On the other hand, the polarizing plate in which lamination was beforehand carried out and was obtained as an optical member, such as an elliptically polarizing plate, is excellent in a stable quality, a workability in lamination etc., and has an advantage in improved manufacturing efficiency of a liquid crystal display.

A viewing angle compensation film is a film for extending viewing angle so that a picture may look comparatively clearly, even when it is viewed from an oblique direction not from vertical direction to a screen. As such a viewing angle compensation retardation plate, in addition, a film having birefringence property that is processed by uniaxial stretching or orthogonal biaxial stretching and a bi-directional stretched film as inclined orientation film etc. may be used. As inclined orientation film, for example, a film obtained using a method in which a heat shrinking film is adhered to a polymer film, and then the combined film is heated and stretched or shrinked under a condition of being influenced by a shrinking force, or a film that is oriented in oblique direction may be mentioned. The viewing angle compensation film is suitably combined for the purpose of prevention of coloring caused by change of visible angle based on retardation by liquid crystal cell etc. and of expansion of viewing angle with good visibility.

Besides, a compensation plate in which an optical anisotropy layer consisting of an alignment layer of liquid crystal polymer, especially consisting of an inclined alignment layer of discotic liquid crystal polymer is supported with triacetyl cellulose film may preferably be used from a viewpoint of attaining a wide viewing angle with good visibility.

The polarizing plate with which a polarizing plate and a brightness enhancement film are adhered together is usually used being prepared in a backside of a liquid crystal cell. A brightness enhancement film shows a characteristic that reflects linearly polarized light with a predetermined polarization axis, or circularly polarized light with a predetermined direction, and that transmits other light, when natural light by back lights of a liquid crystal display or by reflection from a back-side etc., comes in. The polarizing plate, which is obtained by laminating a brightness enhancement film to a polarizing plate, thus does not transmit light without the predetermined polarization state and reflects it, while obtaining transmitted light with the predetermined polarization state by accepting a light from light sources, such as a backlight. This polarizing plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarizing plate simultaneously supplies polarized light that is difficult to be absorbed in a polarizer, and increases the quantity of the light usable for a liquid crystal picture display etc., and as a result luminosity may be improved. That is, in the case where the light enters through a polarizer from backside of a liquid crystal cell by the back light etc. without using a brightness enhancement film, most of the light, with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhancement film does not enter the light with the polarizing direction absorbed by the polarizer into the polarizer but reflects the light once by the brightness enhancement film, and further makes the light reversed through the reflective layer etc. prepared in the backside to re-enter the light into the brightness enhancement film. By this above-mentioned repeated operation, only when the polarization direction of the light reflected and reversed between the both becomes to have the polarization direction which may pass a polarizer, the brightness enhancement film transmits the light to supply it to the polarizer. As a result, the light from a backlight may be efficiently used for the display of the picture of a liquid crystal display to obtain a bright screen.

A diffusion plate may also be prepared between brightness enhancement film and the above described reflective layer, etc. A polarized light reflected by the brightness enhancement film goes to the above described reflective layer etc., and the diffusion plate installed diffuses passing light uniformly and changes the light state into depolarization at the same time. That is, the diffusion plate returns polarized light to natural light state. Steps are repeated where light, in the unpolarized state, i.e., natural light state, reflects through reflective layer and the like, and again goes into brightness enhancement film through diffusion plate toward reflective layer and the like. Diffusion plate that returns polarized light to the natural light state is installed between brightness enhancement film and the above described reflective layer, and the like, in this way, and thus a uniform and bright screen may be provided while maintaining brightness of display screen, and simultaneously controlling non-uniformity of brightness of the display screen. By preparing such diffusion plate, it is considered that number of repetition times of reflection of a first incident light increases with sufficient degree to provide uniform and bright display screen conjointly with diffusion function of the diffusion plate.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film having a different refractive-index anisotropy; an aligned film of cholesteric liquid-crystal polymer; a film that has the characteristics of reflecting a circularly polarized light with either left-handed or right-handed rotation and transmitting other light, such as a film on which the aligned cholesteric liquid crystal layer is supported; etc. may be mentioned.

Therefore, in the brightness enhancement film of a type that transmits a linearly polarized light having the above-mentioned predetermined polarization axis, by arranging the polarization axis of the transmitted light and entering the light into a polarizing plate as it is, the absorption loss by the polarizing plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light band, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarizing plate and a brightness enhancement film may consist of one or more retardation layers.

In addition, also in a cholesteric liquid-crystal layer, a layer reflecting a circularly polarized light in a wide wavelength ranges, such as a visible-light band, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarizing plate may consist of multi-layered film of laminated layers of a polarizing plate and two of more of optical layers as the above-mentioned separated type polarizing plate. Therefore, a polarizing plate may be a reflection type elliptically polarizing plate or a semi-transmission type elliptically polarizing plate, etc. in which the above-mentioned reflection type polarizing plate or a transflective type polarizing plate is combined with above described retardation plate respectively.

Although an optical member with the above described optical layer laminated to the polarizing plate may be formed by a method in which laminating is separately carried out sequentially in manufacturing process of a liquid crystal display etc., an optical member in a form of being laminated beforehand has an outstanding advantage that it has excellent stability in quality and assembly workability, etc., and thus manufacturing processes ability of a liquid crystal display etc. may be raised. Proper adhesion means, such as a pressure sensitive adhesive layer, may be used for laminating. On the occasion of adhesion of the above described polarizing plate and other optical members, the optical axis may be set as a suitable configuration angle according to the target retardation characteristics etc.

In addition, in the present invention, ultraviolet absorbing property may be given to the above-mentioned each layer, such as a pressure sensitive adhesive optical member, an optical member etc. and an pressure sensitive adhesive layer, using a method of adding UV absorbents, such as salicylic acid ester type compounds, benzophenol type compounds, benzotriazol type compounds, cyano acrylate type compounds, and nickel complex salt type compounds.

A pressure sensitive adhesive optical member of the present invention may be preferably used for manufacturing various equipment, such as liquid crystal display, etc. Assembling of a liquid crystal display may be carried out according to conventional methods. That is, a liquid crystal display is generally manufactured by suitably assembling several parts such as a liquid crystal cell, optical members and, if necessary, lighting system, and by incorporating driving circuit. In the present invention, except that an optical member by the present invention is used, there is especially no limitation to use any conventional methods. Also any liquid crystal cell of arbitrary type, such as TN type, and STN type, π type may be used.

Suitable liquid crystal displays, such as liquid crystal display with which the above-mentioned pressure sensitive adhesive optical member has been located at one side or both sides of the liquid crystal cell, and with which a backlight or a reflector is used for a lighting system may be manufactured. In this case, the pressure sensitive adhesive optical member by the present invention may be installed in one side or both sides of the liquid crystal cell. When installing the optical members in both sides, they may be of the same type or of different type. Furthermore, in assembling a liquid crystal display, suitable parts, such as diffusion plate, anti-glare layer, antireflection film, protective plate, prism array, lens array sheet, optical diffusion plate, and backlight, may be installed in suitable position in one layer or two or more layers.

Subsequently, organic electro luminescence equipment (organic EL display) will be explained. Generally, in organic EL display, a transparent electrode, an organic emitting layer and a metal electrode are laminated on a transparent substrate in an order configuring an illuminant (organic electro luminescence illuminant). Here, an organic emitting layer is a laminated material of various organic thin films, and much compositions with various combination are known, for example, a laminated material of hole injection layer comprising triphenylamine derivatives etc., an emitting layer comprising fluorescent organic solids, such as anthracene; a laminated material of electronic injection layer comprising such an emitting layer and perylene derivatives, etc.; laminated material of these hole injection layers, emitting layer, and electronic injection layer etc.

An organic EL display emits light based on a principle that positive hole and electron are injected into an organic emitting layer by impressing voltage between a transparent electrode and a metal electrode, the energy produced by recombination of these positive holes and electrons excites fluorescent substance, and subsequently light is emitted when excited fluorescent substance returns to ground state. A mechanism called recombination which takes place in a intermediate process is the same as a mechanism in common diodes, and, as is expected, there is a strong non-linear relationship between electric current and luminescence strength accompanied by rectification nature to applied voltage.

In an organic EL display, in order to take out luminescence in an organic emitting layer, at least one electrode must be transparent. The transparent electrode usually formed with transparent electric conductor, such as indium tin oxide (ITO), is used as an anode. On the other hand, in order to make electronic injection easier and to increase luminescence efficiency, it is important that a substance with small work function is used for cathode, and metal electrodes, such as Mg—Ag and Al—Li, are usually used.

In organic EL display of such a configuration, a very thin film about 10 nm forms an organic emitting layer in thickness. For this reason, light is transmitted nearly completely through organic emitting layer as through transparent electrode. Consequently, since the light that enters, when light is not emitted, as incident light from a surface of a transparent substrate and is transmitted through a transparent electrode and an organic emitting layer and then is reflected by a metal electrode, appears in front surface side of the transparent substrate again, a display side of the organic EL display looks like mirror if viewed from outside.

In an organic EL display containing an organic electro luminescence illuminant equipped with a transparent electrode on a surface side of an organic emitting layer that emits light by impression of voltage, and at the same time equipped with a metal electrode on a back side of organic emitting layer, a retardation plate may be installed between these transparent electrodes and a polarizing plate, while preparing the polarizing plate on the surface side of the transparent electrode.

Since the retardation plate and the polarizing plate have function polarizing the light that has entered as incident light from outside and has been reflected by the metal electrode, they have an effect of making the mirror surface of metal electrode not visible from outside by the polarization action. If a retardation plate is configured with a quarter wavelength plate and the angle between the two polarization directions of the polarizing plate and the retardation plate is adjusted to π/4, the mirror surface of the metal electrode may be completely covered.

This means that only linearly polarized light component of the external light that enters as incident light into this organic EL display is transmitted with the work of polarizing plate. This linearly polarized light generally gives an elliptically polarized light by the retardation plate, and especially the retardation plate is a quarter wavelength plate, and moreover when the angle between the two polarization directions of the polarizing plate and the retardation plate is adjusted to n/4, it gives a circularly polarized light.

This circularly polarized light is transmitted through the transparent substrate, the transparent electrode and the organic thin film, and is reflected by the metal electrode, and then is transmitted through the organic thin film, the transparent electrode and the transparent substrate again, and is turned into a linearly polarized light again with the retardation plate. And since this linearly polarized light lies at right angles to the polarization direction of the polarizing plate, it cannot be transmitted through the polarizing plate. As the result, mirror surface of the metal electrode may be completely covered.

EXAMPLES

Hereinafter, the present invention is described in more detail by reference to the Examples, but the present invention is not limited by the Examples. In the Examples, "parts" and "%" refer to "parts by weight" and "% by weight", respectively.

(Measurement of Weight-Average Molecular Weight)

The weight-average molecular weight of the prepared (meth)acrylic polymer was measured by GPC (gel permeation chromatography) with using polystyrene standards.
GPC unit: HLC-8120GPC manufactured by Tosoh Corporation
Columns: $G7000H_{XL}+GMH_{XL}+GMH_{XL}$ manufactured by Tosoh Corporation
Column size: 7.8 mm$\phi$30 cm×3 (total 90 cm)
Flow rate: 0.8 ml/min
Concentration: 0.1 wt %
Injection volume: 100 μl
Column temperature: 40° C.
Eluent: THF
Detector: differential refractometer (Measurement of a Content of Polymer Components with Molecular Weights of 100,000 or less)

The content of polymer components with molecular weights of 100,000 or less was calculated from results of the above GPC measurement by using a data processor (GPC-8020 manufactured by Tosoh Corporation). However, monomer components were not included in the measurement results.

(Measurement of a Viscosity of the Pressure Sensitive Adhesive Composition for an Optical Member)

The viscosity of the pressure sensitive adhesive composition for an optical member was measured under the following conditions with TV-20 viscometer, spindle type (Toki Sangyo Co., Ltd.).
Rotor: THH-14
Number of revolutions: 10 rpm
Shear strength: 2.5/s
Measurement temperature: 23° C.

(Evaluation of Applicability of the Pressure Sensitive Adhesive Composition for an Optical Member)

The applicability of the pressure sensitive adhesive composition for an optical member was evaluated in terms of viscosity and surface uniformity. The evaluation results are shown in Table 1.
Viscosity: In the above viscosity measurement, ○ (good) was given to less than 10000 mPa·s, while x (not good) was given to 10000 mPa·s or more.
Surface uniformity: In coating, ○ was given to the case where a uniform coating surface could be formed without polymer precipitation, while x was given to the case where the polymer was precipitated and a uniform coating surface could not be formed.

(Evaluation of the Durability of the Pressure Sensitive Adhesive Optical. Member)

The resulting pressure sensitive adhesive optical member (15-inch size, 240×320 mm) was attached to an alkali-free glass (Corning 1737, 250×350 mm, thickness 0.7 mm) to prepare a sample. The sample was stored for 15 minutes in an autoclave at 50° C., 0.5 MPa. Thereafter, the sample was stored for 500 hours in an environment at 80° C. and then stored for 500 hours in an environment at 60° C. and 90% relative humidity. Thereafter, the sample was used to evaluate the durability of the pressure sensitive adhesive optical member under the following criteria:
○: No raising or peeling of the optical member is observed.
x: Raising or peeling of the optical member is observed.

Example 1

Preparation of a Pressure Sensitive Adhesive Composition for an Optical Member 70 parts of butyl acrylate, 25 parts of 2-ethylhexyl acrylate, 5 parts of acrylic acid, 0.08 part of 2-hydroxyethyl acrylate, 0.1 part of 2,2-azobisisobutyronitrile and 160 parts of ethyl acetate were charged into a 4-neck flask equipped with a nitrogen introducing tube and a cooling tube, and after the atmosphere in the flask was sufficiently replaced with nitrogen, the mixture was subjected to polymerization reaction at 5500 for 10 hours with stirring in a nitrogen stream, to give a solution (1) (solid content: 37 wt %) containing an acrylic polymer having a weight-average molecular weight of 2,200,000 wherein a content of a polymer component having a molecular weight of 100,000 or less was 2 wt %.

327.3 parts of heptane (solubility parameter: 7.3), 27.3 parts of toluene (solubility parameter: 8.9), and 30.9 parts of ethyl acetate (solubility parameter: 9.1) were added to the solution (1), to give a solution (2) (solid content: 15 wt %). A content of the hydrocarbon-based solvent A (heptane) in the solution (2) was 60% of the whole organic solvent, and the content of the high-boiling highly solubilizing solvent B (toluene) therein was 5% of the whole organic solvent.

Based on 100 parts of the polymer solid content of the solution (2), 0.1 part of 3-glycidoxypropyltrimethoxy silane as a silane coupling agent and 0.5 part of a polyisocyanate-based crosslinking agent consisting of tolylenediisocyanate adduct of trimethylolpropane were added to the solution (2), and uniformly mixed to prepare a pressure sensitive adhesive composition (a) for an optical member.

(Preparation of a Pressure Sensitive Adhesive Optical Member)

The pressure sensitive adhesive composition (a) for an optical member was applied onto a silicone-peel-treated polyethylene terephthalate film (thickness: 38 μm) such that a thickness of the resulting layer after drying became 25 μm, followed by drying at 140° C. for 2 minutes, thereby forming a pressure sensitive adhesive layer for an optical member. The pressure sensitive adhesive layer for an optical member was attached to a polarizing plate to prepare a pressure sensitive adhesive optical member.

Example 2

Preparation of a Pressure Sensitive Adhesive Composition for an Optical Member 245.5 parts of heptane, 109.1 pats of toluene and 30.9 parts of ethyl acetate were added to the solution (1) to give solution (3) (solid content: 15 wt %). A content of the hydrocarbon-based solvent A (heptane) in the solution (3) was 45% of the whole organic solvent, and a content of the high-boiling highly solubilizing solvent B (toluene) therein was 20% of the whole organic solvent.

Based on 100 parts of the polymer solid content of the solution (3), 0.1 part of 3-glycidoxypropyltrimethoxy silane as a silane coupling agent and 0.5 part of a polyisocyanate-based crosslinking agent consisting of a tolylenediisocyanate adduct of trimethylolpropane were added to the solution (3)

and uniformly mixed to prepare a pressure sensitive adhesive composition (b) for an optical member.
(Preparation of a Pressure Sensitive Adhesive Optical Member)

A pressure sensitive adhesive optical member was prepared in the same manner as in Example 1 except that the pressure sensitive adhesive composition (b) for an optical member was used.

Example 3

Preparation of a Pressure Sensitive Adhesive Composition for an Optical Member 190.9 parts of heptane, 27.3 pats of toluene and 30.9 parts of ethyl acetate were added to the solution (1) to give solution (4) (solid content: 15 wt %). A content of the hydrocarbon-based solvent A (heptane) in the solution (4) was 35% of the whole organic solvent, and a content of the high-boiling highly solubilizing solvent B (toluene) therein was 5% of the whole organic solvent.

Based on 100 parts of the polymer solid content of the solution (4), 0.1 part of 3-glycidoxypropyltrimethoxy silane as a silane coupling agent and 0.5 part of a polyisocyanate-based crosslinking agent consisting of a tolylenediisocyanate adduct of trimethylolpropane were added to the solution (4) and uniformly mixed to prepare a pressure sensitive adhesive composition (c) for an optical member.
Preparation of a Pressure Sensitive Adhesive Optical Member A pressure sensitive adhesive optical member was prepared in the same manner as in Example 1 except that the pressure sensitive adhesive composition (c) for an optical member was used.

Example 4

Preparation of a Pressure Sensitive Adhesive Composition for an Optical Member 109.1 parts of heptane, 245.5 pats of toluene and 30.9 parts of ethyl acetate were added to the solution (1) to give solution (5) (solid content: 15 wt %). A content of the hydrocarbon-based solvent A (heptane) in the solution (5) was 20% of the whole organic solvent, and a content of the high-boiling highly solubilizing solvent B (toluene) therein was 45% of the whole organic solvent.

Based on 100 parts of the polymer solid content of the solution (5), 0.1 part of 3-glycidoxypropyltrimethoxy silane as a silane coupling agent and 0.5 part of a polyisocyanate-based crosslinking agent consisting of a tolylenediisocyanate adduct of trimethylolpropane were added to the solution (5) and uniformly mixed to prepare a pressure sensitive adhesive composition (d) for an optical member.
(Preparation of a Pressure Sensitive Adhesive Optical Member)

A pressure sensitive adhesive optical member was prepared in the same manner as in Example 1 except that the pressure sensitive adhesive composition (d) for an optical member was used.

Example 5

Preparation of a Pressure Sensitive Adhesive Composition for an Optical Member 245.5 parts of hexane (solubility parameter: 7.3), 109.1 pats of toluene and 30.9 parts of ethyl acetate were added to the solution (1) to give solution (6) (solid content: 15 wt %). A content of the hydrocarbon-based solvent A (hexane) in the solution (6) was 45% of the whole organic solvent, and a content of the high-boiling highly solubilizing solvent B (ethyl acetate + toluene) therein was 55% of the whole organic solvent.

Based on 100 parts of the polymer solid content of the solution (6), 0.1 part of 3-glycidoxypropyltrimethoxy silane as a silane coupling agent and 0.5 part of a polyisocyanate-based crosslinking agent consisting of a tolylenediisocyanate adduct of trimethylolpropane were added to the solution (6) and uniformly mixed to prepare a pressure sensitive adhesive composition (e) for an optical member.
(Preparation of a Pressure Sensitive Adhesive Optical Member)

A pressure sensitive adhesive optical member was prepared in the same manner as in Example 1 except that the pressure sensitive adhesive composition (e) for an optical member was used.

Example 6

Preparation of a Pressure Sensitive Adhesive Composition for an Optical Member 245.5 parts of Cactus Solvent (Japan Energy Corporation), 109.1 pats of toluene and 30.9 parts of ethyl acetate were added to the solution (1) to give solution (7) (solid content: 15 wt %). A content of the hydrocarbon-based solvent A (Cactus Solvent) in the solution (7) was 45% of the whole organic solvent, and a content of the high-boiling highly solubilizing solvent B (toluene) therein was 20% of the whole organic solvent.

Based on 100 parts of the polymer solid content of the solution (7), 0.1 part of 3-glycidoxypropyltrimethoxy silane as a silane coupling agent and 0.5 part of a polyisocyanate-based crosslinking agent consisting of a tolylenediisocyanate adduct of trimethylolpropane were added to the solution (7) and uniformly mixed to prepare a pressure sensitive adhesive composition (f) for an optical member.
(Preparation of a Pressure Sensitive Adhesive Optical Member)

A pressure sensitive adhesive optical member was prepared in the same manner as in Example 1 except that the pressure sensitive adhesive composition (f) for an optical member was used.

Example 7

Preparation of a Pressure Sensitive Adhesive Composition for an Optical Member 100 parts of butyl acrylate, 5 parts of acrylic acid, 0.07 part of 2-hydroxyethyl acrylate, 0.2 part of benzoyl peroxide and 160 parts of ethyl acetate were charged into a 4-neck flask equipped with a nitrogen introducing tube and a cooling tube, and after the atmosphere in the flask was sufficiently replaced with nitrogen, the mixture was subjected to polymerization reaction at 58° C. for 10 hours with stirring in a nitrogen stream, to give a solution (8) (solid content: 37 wt %) containing an acrylic polymer having a weight-average molecular weight of 2,000,000 wherein a content of a polymer component having a molecular weight of 100,000 or less was 2 wt %.

Preparation of a Pressure Sensitive Adhesive Composition for an Optical Member 250.5 parts of heptane, 111.3 pats of toluene and 34.8 parts of ethyl acetate were added to the solution (8) to give solution (9) (solid content: 15 wt %). A content of the hydrocarbon-based solvent A (heptane) in the solution (9) was 45% of the whole organic solvent, and a content of the high-boiling highly solubilizing solvent B (toluene) therein was 20% of the whole organic solvent.

Based on 100 parts of the polymer solid content of the solution (9), 0.075 part of 3-glycidoxypropyltrimethoxy silane as a silane coupling agent and 0.6 part of a polyisocyanate-based crosslinking agent consisting of a tolylenediisocyanate adduct of trimethylolpropane were added to the solution (9) and uniformly mixed to prepare a pressure sensitive adhesive composition (g) for an optical member.

(Preparation of a Pressure Sensitive Adhesive Optical Member)

A pressure sensitive adhesive optical member was prepared in the same manner as in Example 1 except that the pressure sensitive adhesive composition (g) for an optical member was used.

Comparative Example 1

Preparation of a Pressure Sensitive Adhesive Composition for an Optical Member 546 parts of ethyl acetate was added to the solution (1) to give solution (10) (solid content: 12 wt %).

Based on 100 parts of the polymer solid content of the solution (10), 0.1 part of 3-glycidoxypropyltrimethoxy silane as a silane coupling agent and 0.5 part of a polyisocyanate-based crosslinking agent consisting of a tolylenediisocyanate adduct of trimethylolpropane were added to the solution (10) and uniformly mixed to prepare a pressure sensitive adhesive composition (h) for an optical member.

(Preparation of a Pressure Sensitive Adhesive Optical Member)

A pressure sensitive adhesive optical member was prepared in the same manner as in Example 1 except that the pressure sensitive adhesive composition (h) for an optical member was used.

Comparative Example 2

Preparation of a Pressure Sensitive Adhesive Composition for an Optical Member 385.5 parts of ethyl acetate was added to the solution (1) to give solution (11) (solid content: 15 wt %).

Based on 100 parts of the polymer solid content of the solution (11), 0.1 part of 3-glycidoxypropyltrimethoxy silane as a silane coupling agent and 0.5 part of a polyisocyanate-based crosslinking agent consisting of a tolylenediisocyanate adduct of trimethylolpropane were added to the solution (11) and uniformly mixed to prepare a pressure sensitive adhesive composition (i) for an optical member.

(Preparation of a Pressure Sensitive Adhesive Optical Member)

A pressure sensitive adhesive optical member was prepared in the same manner as in Example 1 except that the pressure sensitive adhesive composition (i) for an optical member was used.

Comparative Example 3

Preparation of a Pressure Sensitive Adhesive Composition for an Optical Member 354.6 parts of heptane, 27.3 pats of toluene and 3.7 parts of ethyl acetate were added to the solution (1) to give solution (12) (solid content: 15 wt %). A content of the hydrocarbon-based solvent A (heptane) in the solution (12) was 65% of the whole organic solvent, and a content of the high-boiling highly solubilizing solvent B (toluene) therein was 5% of the whole organic solvent.

Based on 100 parts of the polymer solid content of the solution (12), 0.1 part of 3-glycidoxypropyltrimethoxy silane as a silane coupling agent and 0.5 part of a polyisocyanate-based crosslinking agent consisting of a tolylenediisocyanate adduct of trimethylolpropane were added to the solution (12) and uniformly mixed to prepare a pressure sensitive adhesive composition (j) for an optical member.

(Preparation of a Pressure Sensitive Adhesive Optical Member)

A pressure sensitive adhesive optical member was prepared in the same manner as in Example 1 except that the pressure sensitive adhesive composition (j) for an optical member was used.

Comparative Example 4

Preparation of a Pressure Sensitive Adhesive Composition for an Optical Member 327.3 parts of heptane and 58.2 parts of ethyl acetate were added to the solution (1) to give solution (13) (solid content: 15 wt %). A content of the hydrocarbon-based solvent A (heptane) in the solution (13) was 60% of the whole organic solvent.

Based on 100 parts of the polymer solid content of the solution (13), 0.1 part of 3-glycidoxypropyltrimethoxy silane as a silane coupling agent and 0.5 part of a polyisocyanate-based crosslinking agent consisting of a tolylenediisocyanate adduct of trimethylolpropane were added to the solution (13) and uniformly mixed to prepare a pressure sensitive adhesive composition (k) for an optical member.

(Preparation of a Pressure Sensitive Adhesive Optical Member)

A pressure sensitive adhesive optical member was prepared in the same manner as in Example 1 except that the pressure sensitive adhesive composition (k) for an optical member was used.

Comparative Example 5

Preparation of a Pressure Sensitive Adhesive Composition for an Optical Member 54.6 parts of heptane, 109.1 pats of toluene and 221.9 parts of ethyl acetate were added to the solution (1) to give solution (14) (solid content: 15 wt %). A content of the hydrocarbon-based solvent A (heptane) in the solution (14) was 10% of the whole organic solvent, and a content of the high-boiling highly solubilizing solvent B (toluene) therein was 20% of the whole organic solvent.

Based on 100 parts of the polymer solid content of the solution (14), 0.1 part of 3-glycidoxypropyltrimethoxy silane as a silane coupling agent and 0.5 part of a polyisocyanate-based crosslinking agent consisting of a tolylenediisocyanate adduct of trimethylolpropane were added to the solution (14)

and uniformly mixed to prepare a pressure sensitive adhesive composition (1) for an optical member.

Preparation of a Pressure Sensitive Adhesive Optical Member

A pressure sensitive adhesive optical member was prepared in the same manner as in Example 1 except that the pressure sensitive adhesive composition (1) for an optical member was used.

Comparative Example 6

Preparation of a Pressure Sensitive Adhesive Composition for an Optical Member 245.5 parts of decane (solubility parameter: 6.6), 109.1 pats of toluene and 30.9 parts of ethyl acetate were added to the solution (1) to give solution (15) (solid content: 15 wt %). A content of decane in the solution (15) was 45% of the whole organic solvent.

Based on 100 parts of the polymer solid content of the solution (15), 0.1 part of 3-glycidoxypropyltrimethoxy silane as a silane coupling agent and 0.5 part of a polyisocyanate-based crosslinking agent consisting of a tolylenediisocyanate adduct of trimethylolpropane were added to the solution (15) and uniformly mixed to prepare a pressure sensitive adhesive composition (m) for an optical member.

(Preparation of a Pressure Sensitive Adhesive Optical Member)

A pressure sensitive adhesive optical member was prepared in the same manner as in Example 1 except that the pressure sensitive adhesive composition (m) for an optical member was used.

Comparative Example 7

Preparation of a Pressure Sensitive Adhesive Composition for an Optical Member 396.6 parts of ethyl acetate was added to the solution (8) to give solution (16) (solid content: 15 wt %).

Based on 100 parts of the polymer solid content of the solution (16), 0.1 part of 3-glycidoxypropyltrimethoxy silane as a silane coupling agent and 0.5 part of a polyisocyanate-based crosslinking agent consisting of a tolylenediisocyanate adduct of trimethylolpropane were added to the solution (16) and uniformly mixed to prepare a pressure sensitive adhesive composition (n) for an optical member.

(Preparation of a Pressure Sensitive Adhesive Optical Member)

A pressure sensitive adhesive optical member was prepared in the same manner as in Example 1 except that the pressure sensitive adhesive composition (n) for an optical member was used.

TABLE 1

| | Hydrocarbon-based solvent (A) (wt %) | High-boiling highly solubilizing solvent (B) (wt %) | (B)/(A) | Solid content (wt %) | Viscosity (mPa·s) | Applicability Viscosity | Surface uniformity | Durability |
|---|---|---|---|---|---|---|---|---|
| Example 1 | heptane (60) | toluene (5) | 0.08 | 15 | 4100 | ○ | ○ | ○ |
| Example 2 | heptane (45) | toluene (20) | 0.44 | 15 | 4800 | ○ | ○ | ○ |
| Example 3 | heptane (35) | toluene (5) | 0.14 | 15 | 6400 | ○ | ○ | ○ |
| Example 4 | heptane (20) | toluene (45) | 2.25 | 15 | 8700 | ○ | ○ | ○ |
| Example 5 | hexane (45) | ethyl acetate + toluene(55) | 1.22 | 15 | 3500 | ○ | ○ | ○ |
| Example 6 | Cactus Solvent (45) | toluene (20) | 0.44 | 15 | 4900 | ○ | ○ | ○ |
| Example 7 | heptane (45) | toluene (20) | 0.44 | 15 | 4200 | ○ | ○ | ○ |
| Comparative Example 1 | — | — | — | 12 | 6500 | ○ | ○ | ○ |
| Comparative Example 2 | — | — | — | 15 | 26000 | x | ○ | ○ |
| Comparative Example 3 | heptane (65) | toluene (5) | 0.077 | 15 | 3700 | ○ | x | x |
| Comparative Example 4 | heptane (60) | — | — | 15 | 4200 | ○ | x | x |
| Comparative Example 5 | heptane (10) | toluene (20) | 2 | 15 | 18000 | x | ○ | ○ |
| Comparative Example 6 | — | — | — | 15 | 5200 | ○ | x | x |
| Comparative Example 7 | — | — | — | 15 | 22000 | x | ○ | ○ |

As can be obviously seen from Table 1, pressure sensitive adhesive compositions for an optical member excellent in applicability and capable of reducing an amount of an organic solvent used can be obtained in Examples 1 to 7. It can be seen that pressure sensitive adhesive layers formed from the pressure sensitive adhesive compositions for an optical member are excellent in durability and surface uniformity.

The invention claimed is:
1. A pressure sensitive adhesive composition for an optical member, which comprises a (meth)acrylic polymer, a C6 to C9 linear or branched hydrocarbon-based solvent (A), and an aromatic hydrocarbon and aliphatic carboxylate solvent (B) having a boiling point higher than that of the hydrocarbon-based solvent (A) and having a higher ability to solubilize the (meth)acrylic polymer than that of the hydrocarbon-based solvent (A), wherein a content of the hydrocarbon-based solvent (A) is 35 to 50 wt % based on the total amount of the organic solvents, and the content (wt %) of the solvent (B)/the content (wt %) of the hydrocarbon-based solvent (A) is 0.05 to 0.75 and wherein the hydrocarbon-based solvent (A) has a non-cyclic structure.

2. The pressure sensitive adhesive composition for an optical member according to claim 1, wherein the (meth)acrylic polymer comprises 60 wt % or more of alkyl (meth)acrylate having a C2 to C4 alkyl group as a monomer, has a weight-average molecular weight of 1,500,000 or more, and contains 20 wt % or less of low-molecular-weight polymer component having a molecular weight of 100,000 or less.

3. The pressure sensitive adhesive composition for an optical member according to claim 2, wherein the (meth)acrylic polymer further comprises 0.2 to 7 wt % of unsaturated carboxylic acid as a monomer.

4. The pressure sensitive adhesive composition for an optical member according to claim 1, wherein a silane coupling agent is contained in an amount of 0.01 to 1 part by weight based on 100 parts by weight of the (meth)acrylic polymer.

5. The pressure sensitive adhesive composition for an optical member according to claim 1, wherein a crosslinking agent is contained in an amount of 0.1 to 5 parts by weight based on 100 parts by weight of the (meth)acrylic polymer.

6. A pressure sensitive adhesive layer for an optical member, which is formed from the pressure sensitive adhesive composition for an optical member according to claim 1.

7. A pressure sensitive adhesive optical member, which has the pressure sensitive adhesive layer for an optical member according to claim 6 on one side or both sides of an optical member.

8. An image display using at least one pressure sensitive adhesive optical member according to claim 7.

* * * * *